United States Patent [19]
Gerhardt

[11] 3,863,361
[45] Feb. 4, 1975

[54] METHOD AND APPARATUS FOR DRYING A GYPSUM BOARD OR THE LIKE

[75] Inventor: Klaus Gerhardt, Penzberg-Reindl, Germany

[73] Assignee: G. Siempelkamp & Co., Krefeld, Germany

[22] Filed: Mar. 29, 1974

[21] Appl. No.: 456,252

[30] Foreign Application Priority Data
Mar. 30, 1973 Germany............................ 2315981

[52] U.S. Cl.......................... 34/191, 34/155, 34/233
[51] Int. Cl............................................ F26b 21/06
[58] Field of Search ............. 34/191, 155, 160, 233, 34/230, 225, DIG. 19, 162, 163

[56] References Cited
UNITED STATES PATENTS
| | | | |
|---|---|---|---|
| 3,131,034 | 4/1964 | Marsh.................................. | 34/191 |
| 3,659,352 | 5/1972 | Cook................................... | 34/191 |
| 3,727,324 | 4/1973 | Melgaard............................. | 34/233 |

*Primary Examiner*—Carroll B. Dority, Jr.
*Assistant Examiner*—Larry I. Schwartz
*Attorney, Agent, or Firm*—Karl F. Ross; Herbert Dubno

[57] ABSTRACT

A flat workpiece such as a gypsum board is dried as it is passed longitudinally between first and second spaced-apart upright side walls. Extending from these side walls are respective first and second conduits terminating inwardly of the walls at respective first and second nozzles which are directed horizontally towards each other and which lie adjacent a central region of the workpiece. Respective first and second outlets are provided in the side walls adjacent the conduits and means is provided for passing a current of heated air over the workpiece alternately from the first nozzle to the second outlet and from the second nozzle to the first outlet. The nozzles are spaced apart transverse to the direction of workpiece displacement by a distance equal approximately to one quarter of the transverse width of the workpiece. A plurality of such conduits are provided on each of the walls so as to define a plurality of levels, a workpiece being received in each of the levels. The conduits are elongated in the direction of the transport of the workpieces and formed with slits constituting the nozzles. As the hot air ejected by one of the nozzles is constricted as it passes around the facing nozzle it is accelerated and its drying capacity is therefore increased.

8 Claims, 5 Drawing Figures

3,863,361

METHOD AND APPARATUS FOR DRYING A GYPSUM BOARD OR THE LIKE

CROSS-REFERENCE TO RELATED APPLICATION

This application is related to my copending and commonly assigned application Ser. No. 369,734 filed 13 June 1973.

FIELD OF THE INVENTION

The present invention relates to a method of and an apparatus for drying a flat workpiece. More particularly this invention concerns a system for drying boards, such as made from gypsum, of large surface area.

BACKGROUND OF THE INVENTION

In the production of gypsum board and the like it is necessary when the workpiece issues from the press to dry it so as to render it dimensionally stable. As a general rule the workpieces issue in groups, one above the other, from a multiplaten press. Usually such workpieces are loaded onto a rack and then passed through a drying chamber.

In the best known and most efficient drying arrangement of the prior art there are provided a plurality of openings arranged in levels corresponding to the positions of the workpieces as they pass through the drying chamber. Hot air is blown alternately out the openings on one side and drawn in on the other side, then is blown out of this other side and drawn in the one side. This insures that both edges of the boards are dry, since the air as it passes over the wet workpiece tends to pick up considerable moisture and is, therefore, unable to thoroughly dry the workpiece once it has passed over this workpiece for a distance of more than several hundred centimeters. The significant disadvantage of this system is that the central region of the workpiece will exit often dried insufficiently. Thus the workpieces will exit from the drying chamber with their edges sufficiently dried, but with their central region still moist, indeed it is even possible for water to be left standing on the central region, this water being the excess liquid which is not absorbed by the workpiece during the pressing operation. When the workpieces with wet central regions are thereafter stacked one on top of the other these regions take an extremely long time to dry. Meanwhile the workpiece may undergo a change in texture or the like which renders it unusable.

OBJECTS OF THE INVENTION

It is therefore an object of the present invention to provide an improved method and apparatus for drying a surface.

More particularly an object of this invention is an improved system for drying a flat workpiece.

Yet another object is the provision of an improved system for drying gypsum board, fiber board, and the like.

A further object is to provide a method of drying a gypsum board or the like which dries the central region of the board as thoroughly as it dries the edge regions.

SUMMARY OF THE INVENTION

These objects are attained according to the present invention in a system wherein the heated air is blown across the surface of the workpieces from a central region thereof toward an edge thereof. This current of air is first passed outwardly in one direction, then is reversed and passed outwardly in the other direction.

In accordance with yet another feature of this invention the current is accelerated towards the edges so that although it has picked up water vapor from the central region its drying capacity remains the same.

The apparatus according to the present invention comprises a plurality of conduits extending inwardly from facing walls. Each of the conduits has a nozzle at its inner end which lies above a central region of the workpiece and which confronts a similar nozzle of a facing conduit. Means is provided for passing a current of heated air over the workpiece from the nozzles on one side to the outlets on the opposite side and thereafter from the nozzles on the other side to outlets on the original side. These outlets are separate from and adjacent to the conduits.

In this manner the board is dried evenly, since the relatively dry air starts at the center of the board and moves out towards the edge thereof. The conduits constrict the flow passage so that the velocity of this air increases as it passes outwardly. The capacity to dry the board increases with increasing speed so that the outer edges of the board are dried to the same extent as the central region thereof.

In accordance with features of this invention the conduits may be of circular cross-sectional shape and arranged in a plurality of horizontal rows defining levels in a drying chamber enclosed between a pair of spaced-apart upright side walls. The conduits may also have elongated slit openings which constitute the nozzles. In both cases the nozzles of the conduits on one wall are directly across from and in line with the nozzles on the opposite wall.

According to yet another feature of this invention means is provided on the conduits for supporting the workpieces as they are pushed through the press. Thus the workpieces move in a direction perpendicular to the direction of flow of air across them. Such an arrangement is used in accordance with this invention directly down stream of the multiplaten press used to form the boards. Thus the boards are pushed from the press into the drying apparatus wherein they are completely and effectively dried. Thereafter the boards may be stacked one atop the other.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
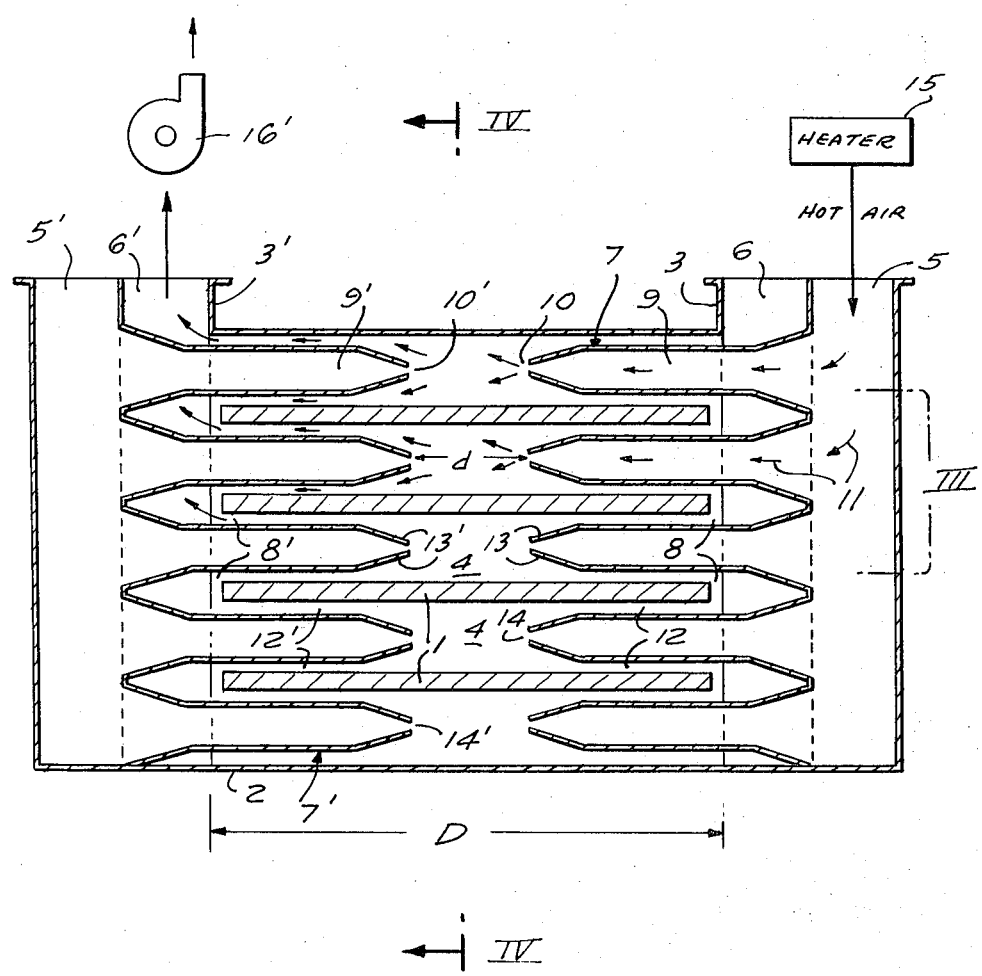
FIG. 1 is a cross section through an apparatus according to the present invention.

As shown in FIG. 1 the drying chamber 2 has a pair of vertically upright side walls 3 and 3 extending parallel to the direction A of travel (FIG. 4) of a plurality of gypsum boards 1 arrayed parallel one above the other. The interior of the chamber 2 is subdivided into levels 4 adapted to receive four such boards 1.

Extending inwardly from the wall 3 at each level 4 is a hot-air injector 7 comprising a conduit 9 terminating outside the wall 3 in a manifold 5 and ending inside the chamber 2 at the nozzle 10 formed by a pair of planar inwardly converging lips 13 which define a slit opening 14 extending parallel to the direction A the full length of the chamber 2. The other wall 3' has similar air injectors 7' formed of similar conduits 9' extending between a manifold 5' and a nozzle 10' having a pair of lips 13' defining a slot 14'. Rollers 17 on the conduits 9 and 9' serve to guide and support the workpiece boards 1.

Figure 3:
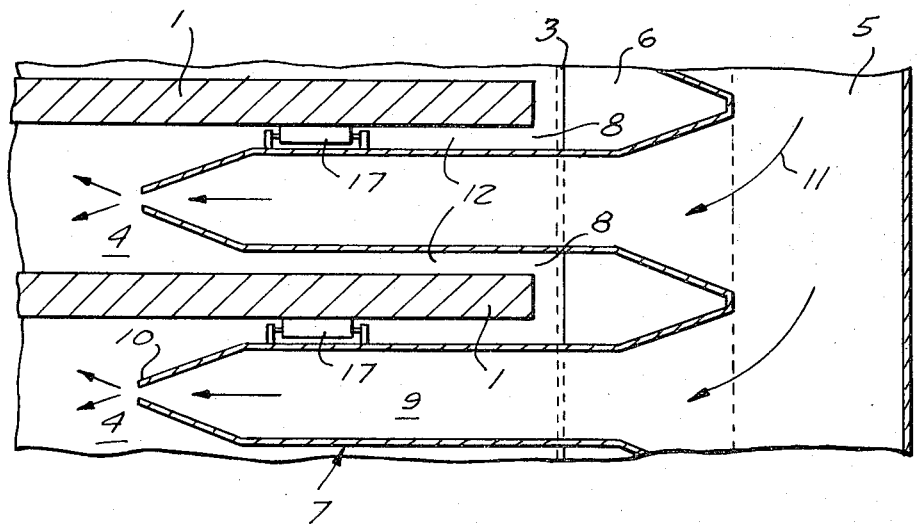
FIG. 3 is a large-scale view of the detail indicated by dot-dash line III of FIG. 1.
Figure 4:
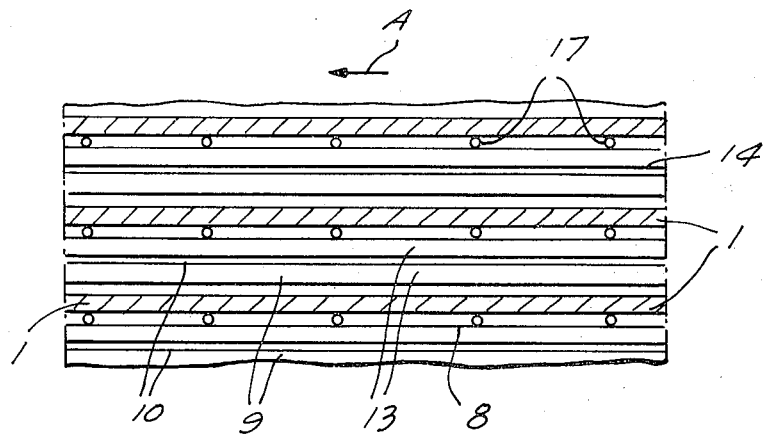
FIG. 4 is a section taken along line IV—IV of FIG. 1.

As also shown in FIGS. 1, 3 and 4 the wall 3 is formed with outlet openings 8 allowing air to flow out of the chamber between spaces 12 defined between the parallel sides of the conduits 9 and the boards 1 and into an outlet manifold 6 lying between the inlet manifold 5 and the wall 3. A similar manifold 6' is connected via outlet openings 8' to constricted spaces 12' between the conduits 9' and the boards 1.

Figure 2:
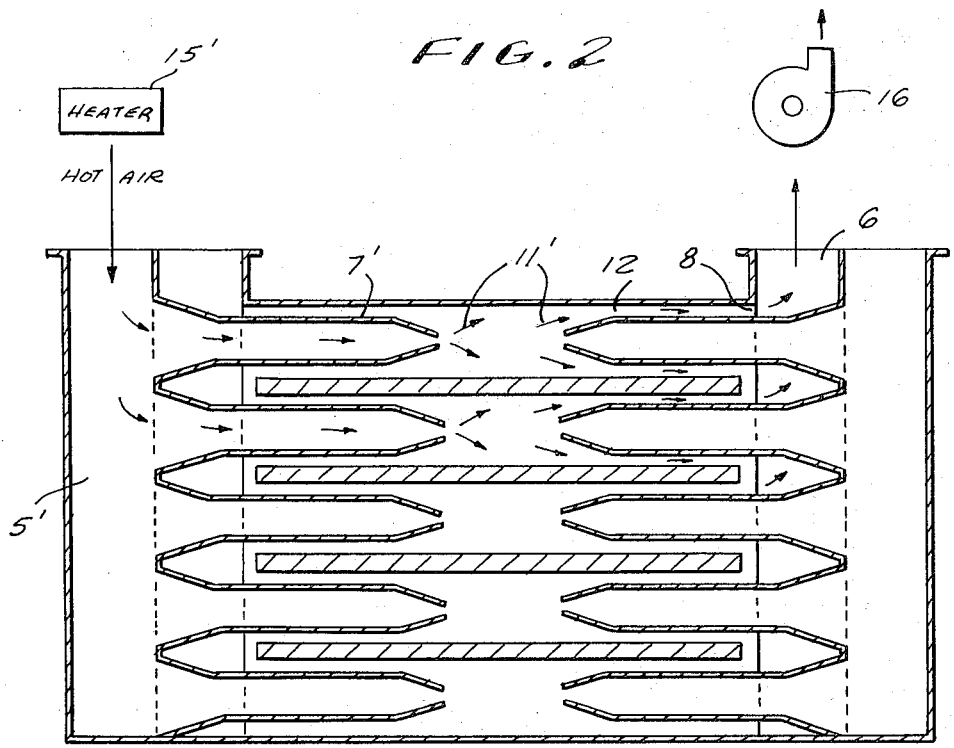
FIG. 2 is a cross section identical to FIG. 1 but showing the opposite flow of hot air.

A heater 15 and 15' is provided upstream of each inlet manifold 5 and 5' and blowers 16 and 16' are provided to draw air out of the intake manifold 6 and 6' as shown in FIGS. 1 and 2. Thus as shown in FIG. 1 hot air heated by the heater 15 can be drawn by blower 16' out of the nozzles 10, through the spaces 12', out the openings 8' and through the manifold 6' as shown by arrows 11. Thereafter as shown by arrows 11' the operation is reversed so that heated air from the heater 15' enters the intake manifold 5', passes through the injector 7' then out around spaces 12, out the outlet 8, and into the manifold 6. This operation dries the boards evenly across their full width.

As shown in FIG. 1 the chamber 2 has an overall width D transverse to the direction A. This width corresponds to slightly more than the width of the boards 1. The gap between the nozzles 10 and 10' corresponds to a distance D which is equal in accordance with this invention to between $D/3$ and $D/5$. In this embodiment it is equal to slightly more than $D/4$. This insures that the critical central regions of the boards 1 are thoroughly dried. The hot air as it is constricted by the spaces 12 and 12' accelerates so that its drying capacity is increased. As a matter of fact it is not of critical importance that the outer edges of the boards 1 be perfectly dry, as when stacked these edges are exposed and dry naturally.

Figure 5:
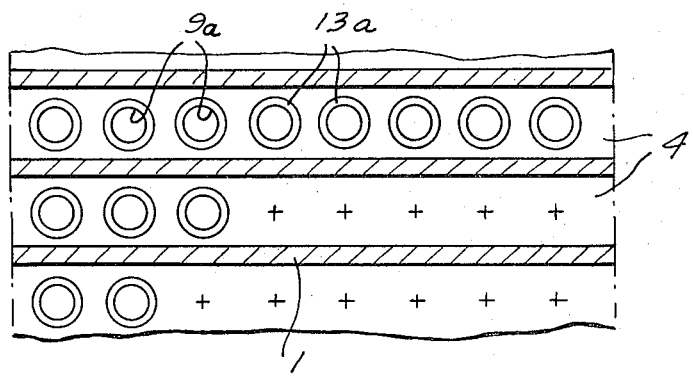
FIG. 5 is a view similar to FIG. 4 showing another configuration of nozzles in accordance with this invention.

FIG. 5 shows an arrangement wherein nozzles 9a are arranged in rows corresponding to the levels 4. These nozzles 9a are of circular cross section and have tapered ends 13a. A blower is connected to the nozzles to force hot air out of them as described above with reference to nozzles 9.

I claim:

1. An apparatus for drying a flat workpiece, said apparatus comprising:
    first and second spaced-apart upright side walls;
    means for supporting said workpiece generally horizontally between said walls;
    respective first and second conduits each extending inwardly from said first and second side walls past the edges of said workpiece and provided adjacent a central region of said workpiece with respective first and second nozzles directed generally horizontally toward each other;
    respective first and second outlets in said first and second walls adjacent said conduits; and
    means for passing a current of heated air over said workpiece alternately from said first nozzle to said second outlet and from said second nozzle to said first outlet.

2. The apparatus defined in claim 1 wherein each of said walls is provided with a plurality of such conduits each having a respective nozzle, said conduits being arranged one above the other and defining a plurality of levels each adapted to receive a respective workpiece.

3. The apparatus defined in claim 2 wherein said conduits are of circular cross-sectional shape and are arranged in a plurality of horizontal rows defining said levels, each of said second conduits lying directly across from and in line with a respective first conduit.

4. The apparatus defined in claim 2 wherein each of said nozzles is horizontally elongated, each of said first nozzles lying directly across from and in line with a respective second nozzle.

5. The apparatus defined in claim 4 wherein said conduits are of greater cross-sectional area at said walls than at said nozzles.

6. The apparatus defined in claim 5 wherein said nozzles are tapered down from said walls and define slit openings.

7. The apparatus defined in claim 5, further comprising first and second outlet manifolds lying directly against respective first and second side walls and openinng at said outlets into the space between said walls and to said means for passing heated air over said workpiece, said conduits extending through said manifolds.

8. The apparatus defined in claim 5 wherein said means for supporting includes a plurality of guides on said conduits engageable with the under surfaces of said workpieces.

* * * * *